No. 670,307. Patented Mar. 19, 1901.
C. B. BISHOP.
SPECTACLES OR EYEGLASSES.
(Application filed Aug. 4, 1899.)
(No Model.)

Witnesses:—
Louis M. Whitehead.
Wm. A. Barr.

Inventor:—
Clement B. Bishop.
by his Attorneys:—
Howson & Howson

THE NORRIS PETERS CO., PHOTO-LITHO., WASHINGTON, D. C.

United States Patent Office.

CLEMENT B. BISHOP, OF PHILADELPHIA, PENNSYLVANIA.

SPECTACLES OR EYEGLASSES.

SPECIFICATION forming part of Letters Patent No. 670,307, dated March 19, 1901.

Application filed August 4, 1899. Serial No. 726,118. (No model.)

*To all whom it may concern:*

Be it known that I, CLEMENT B. BISHOP, a citizen of the United States, residing in Philadelphia, Pennsylvania, have invented certain Improvements in Spectacles or Eyeglasses, of which the following is a specification.

One object of my invention is to so construct a clasp for what are known as "skeleton" or "frameless" spectacles and eyeglasses that one size of clasp is available for use in connection with a number or with all of the different thicknesses of lenses, a further object being to so construct the clasp as to prevent the lens from working loose by reason of the bending of the wings of the end bar of the clasp in the use of the spectacles or eyeglasses.

Figure 1:
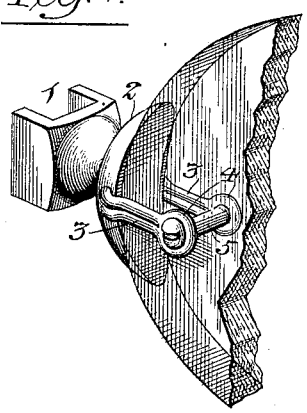
Figure 2:
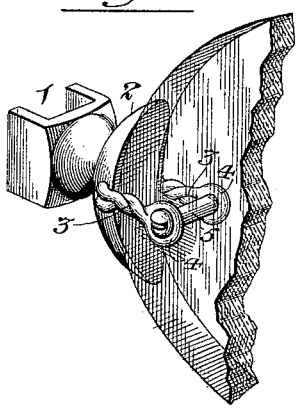

In the accompanying drawings, Figure 1 is a perspective view of a spring post or stud for spectacles or eyeglasses, having a lens-clasp constructed in accordance with my invention. Fig. 2 is a similar view showing the side bars of the clasp adjusted so as to shorten the same; and Figs. 3 to 10, inclusive, are views illustrating modifications of my invention.

Usually clasps whereby the spring-posts, nosepieces, temples, or other parts of skeleton or frameless spectacles are secured to the lenses have been made of a single piece of metal punched so as to form the end and side bars of the clasp, the end bar being intended to bear upon the edge of the lens and the side bars overlapping the lens and being secured together by a screw or rivet passing through an opening formed in the lens some distance from the edge of the same. There are two objections to this method of manufacture, one being that a number of different sizes of clasps must be made to suit different thicknesses of lenses, for if the clasp is constructed for adaptation to a thick lens and is applied to a thin lens the eyes formed in the side bars of the clasp for the reception of the lens-retaining screw will not register with the opening formed in the lens for the reception of said screw, and the same is true under reverse conditions, it being understood that the opening for the screw or rivet is invariably located at a certain distance from the edge of the lens. The other objection to the ordinary method of manufacture is that the end bar and side bars of the clasp are of the same thickness, and as the side bars are necessarily thin in order that they may present a neat appearance and may be readily bent at a right angle the end bar is likewise thin and its upper and lower wings are likely to be bent, so that after a time they fail to fit snugly to the rounded periphery of the lens and the latter is only loosely held in position.

In carrying out my invention with the view of overcoming these objections I make the end bar and side bars of the clasp independent of each other and secure the parts together by soldering, riveting, screwing, or in any other available manner, so that the end bar may be as thick and strong as desired without necessitating corresponding thickness in the side bars, and I so construct said side bars that they can be expanded and contracted in length, whereby their screw-receiving eyes may be readily adjusted, so as to accord with the screw-openings in the lens, whether the latter is thick or thin.

In Figs. 1 and 2 of the drawings, 1 represents the spring-post of a pair of eyeglasses, to which is secured in the usual way the end bar 2 of the lens-clasp, the side bars of the latter consisting of wires 3 3, secured at one end to the end bar 2 and forming or carrying at the other end the eye 4 for the reception of the lens-holding screw 5, these side bars being susceptible of being shortened by twisting the wires of which they are composed, as shown in Fig. 2. The end bar 2 may be of a width equal to that of the thinnest lens or of a width equal to that of the thickest lens, the former construction being preferred.

Figure 3:
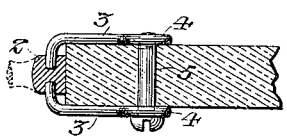
Figure 4:
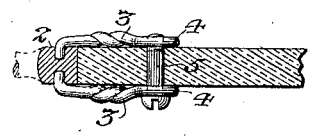

In Figs. 3 and 4 I have shown a clasp having a narrow end bar, Fig. 3 showing the same applied to a thick lens and showing the untwisted side bars wrapped around the inner edge of said lens, while Fig. 4 shows the clasp applied to a thin lens, the side bars being twisted, so as to shorten the same to the extent necessary to bring their screw-receiving eyes into line with the screw-receiving opening in the lens.

Figure 5:
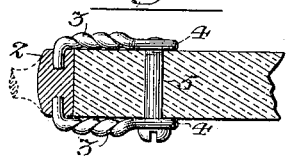
Figure 6:
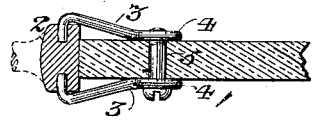

Fig. 5 shows a wide bar clasp applied to a thick lens and having its side bars twisted, so as to shorten the same, while Fig. 6 shows the same form of clasp applied to a thin lens and having the side bars untwisted, so as to lengthen the same to the extent necessary to permit of the bending of the bars in order to adapt them to such a thin lens.

Figure 7:
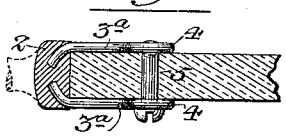
Figure 8:
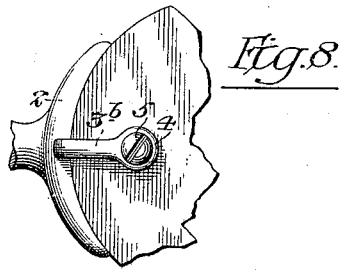
Figure 9:
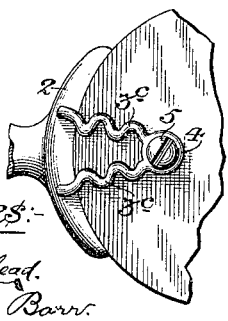
Figure 10:
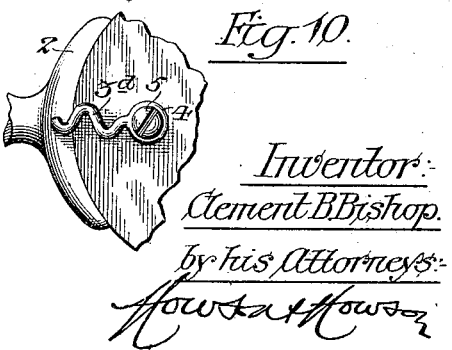

In the constructions shown in Figs. 3 to 6 the side bars project from the side faces of the end bar of the clasp; but, if desired, they may project from that face against which the lens bears, as shown at 3ª in Fig. 7, and instead of consisting of a pair of wires each side bar may consist of a single wire capable of being twisted, as shown, for instance, at 3ᵇ in Fig. 8, or instead of providing for the expansion and contraction of the side bars by twisting said bars may have bent or corrugated portions, as shown, for instance, at 3ᶜ in Fig. 9 or at 3ᵈ in Fig. 10, so as to be susceptible of expansion or contraction without being twisted.

By reason of the thickness of the end bar 2 of the clasp the bending out of position of the upper and lower wings of the same by the pressure of the lens thereupon is prevented, or, if desired, this result may be attained by making the end bar of the clasp of such material or so treating it that it presents a rigid resistance to bending or displacement by the pressure of the lens, the side bars, however, possessing the desired ductility.

Having thus described my invention, I claim and desire to secure by Letters Patent—

1. A lens-clasp for spectacles or eyeglasses, said clasp comprising an end bar and flexible side bars, each of said side bars being expansible and contractible in the direction of its length and retaining a permanent set for each adjustment, whereby the clasp can be adapted to lenses of different thicknesses, while always preserving the central lateral position of the end bar with respect to the lens, substantially as described.

2. A lens-clasp for spectacles or eyeglasses, said clasp comprising an end bar and flexible side bars capable of being twisted and untwisted in order to contract or expand the same in the direction of its length and retaining a permanent set for each adjustment, substantially as specified.

In testimony whereof I have signed my name to this specification in the presence of two subscribing witnesses.

CLEMENT B. BISHOP.

Witnesses:
F. E. BECHTOLD,
JOS. H. KLEIN.